Figure 13:
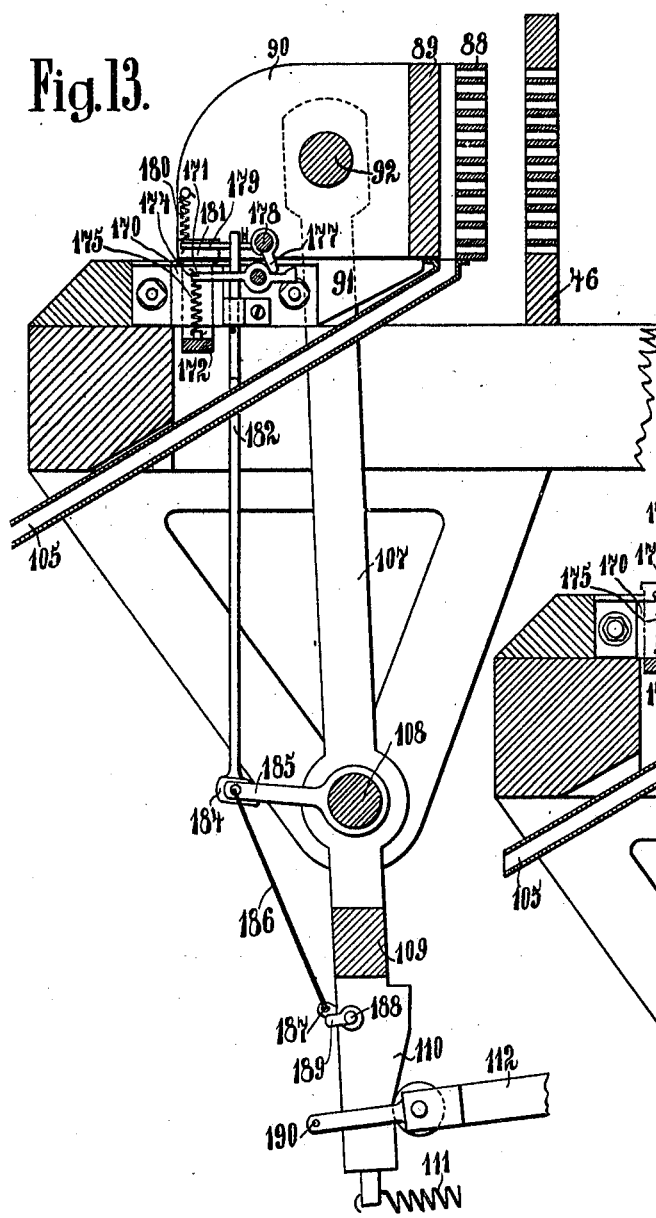

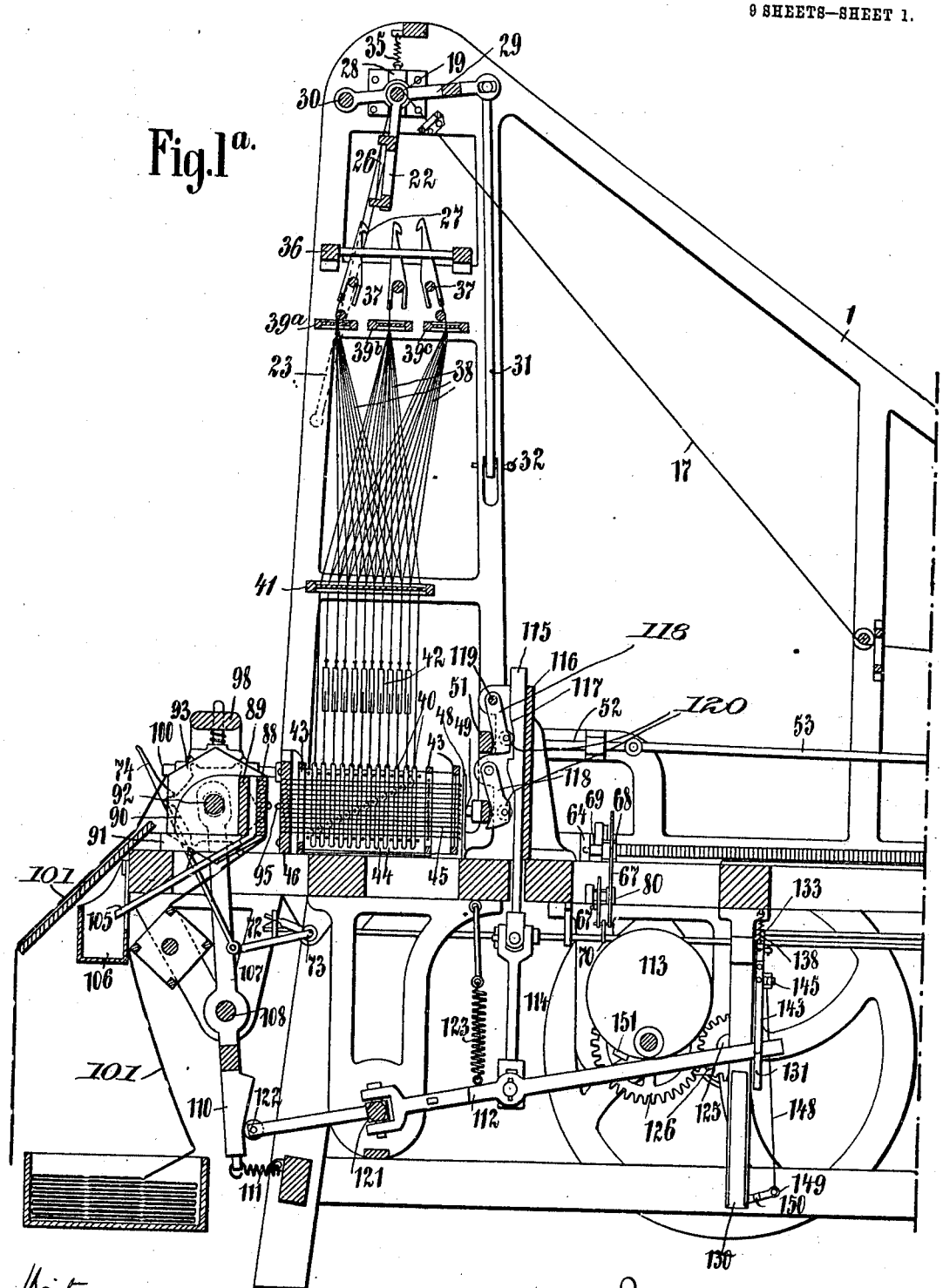

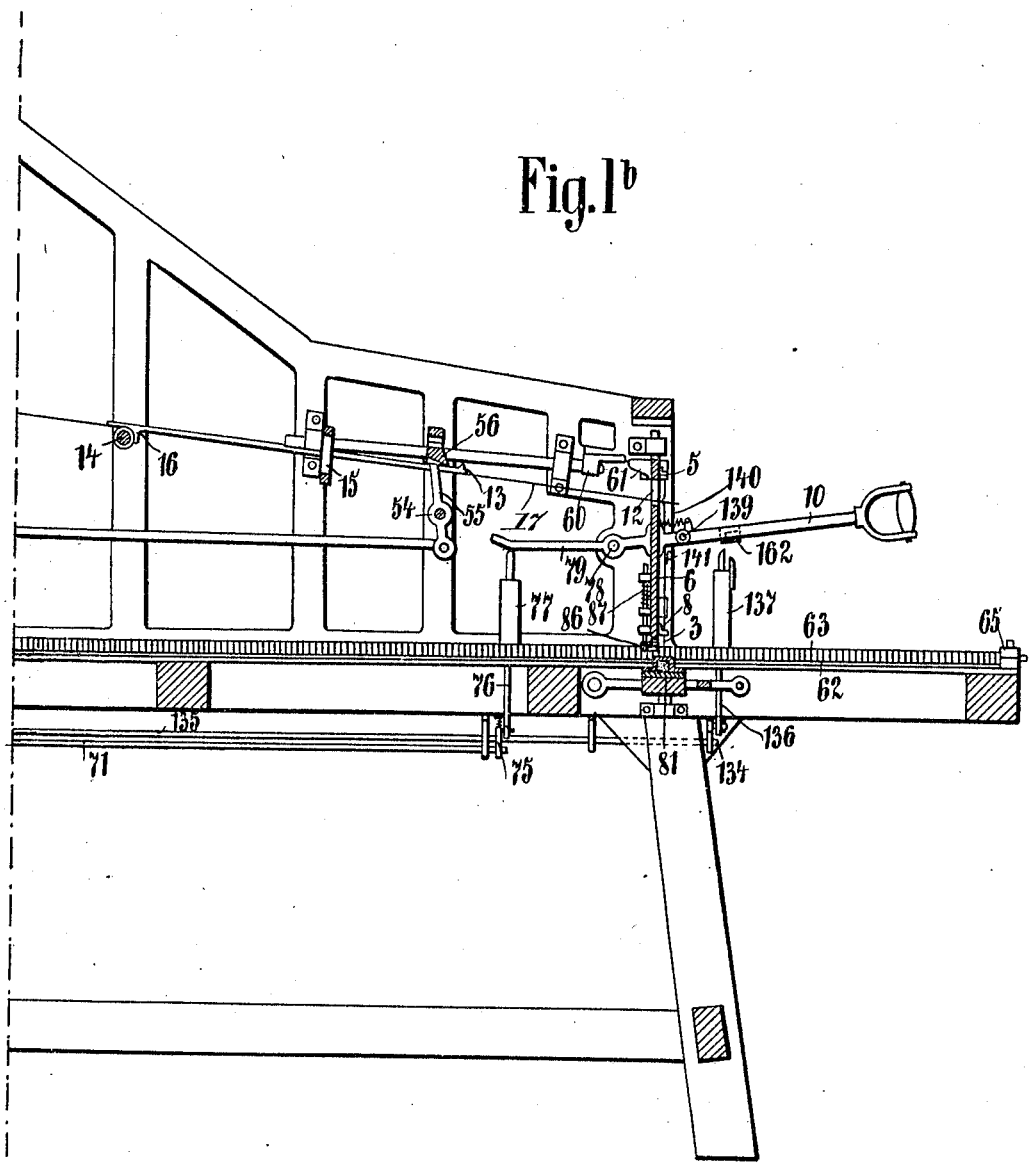

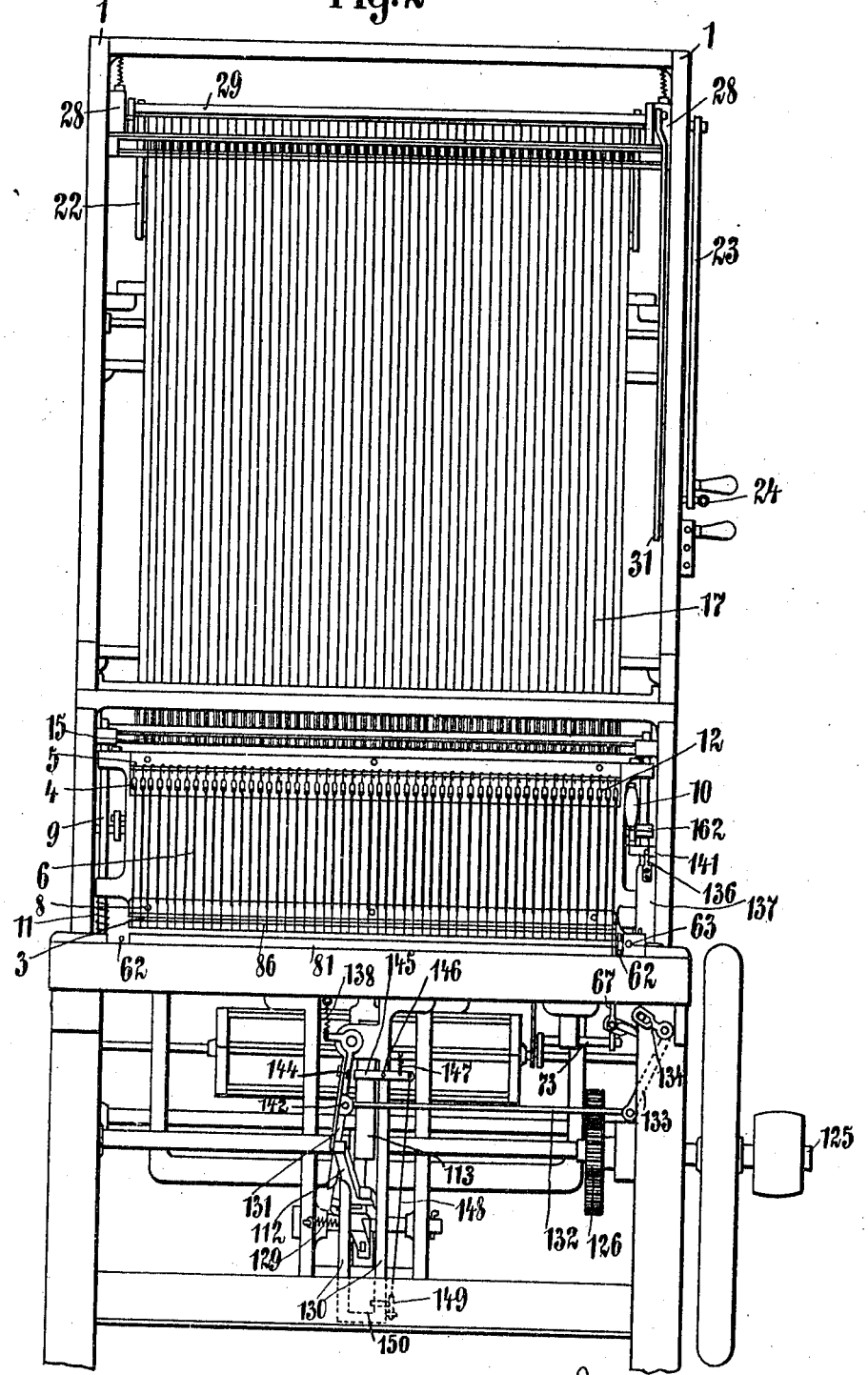

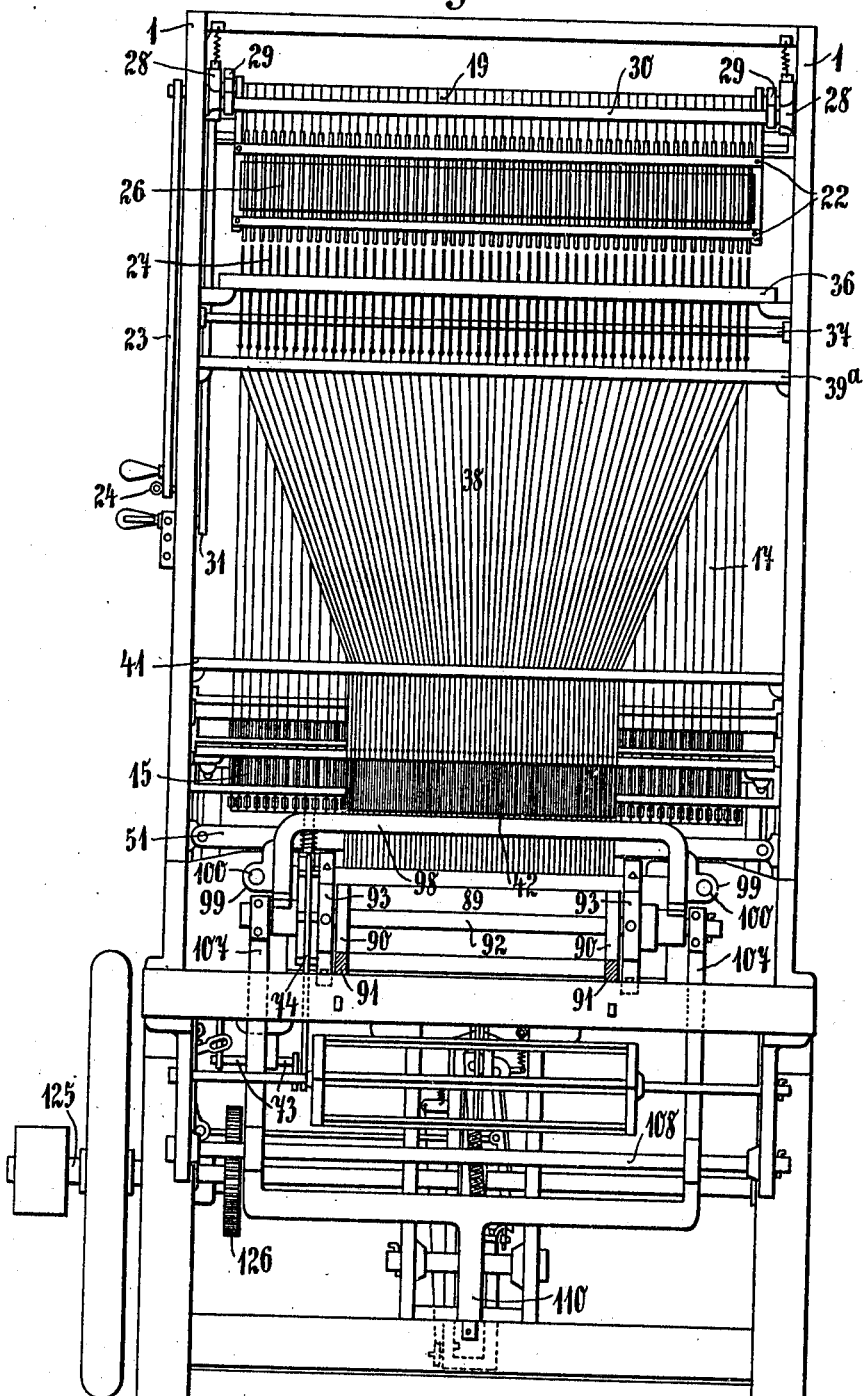

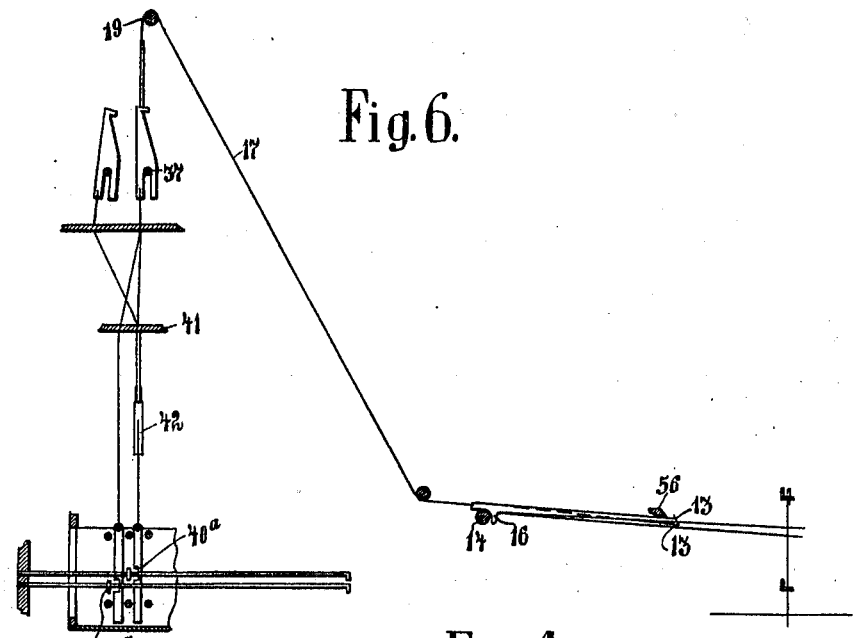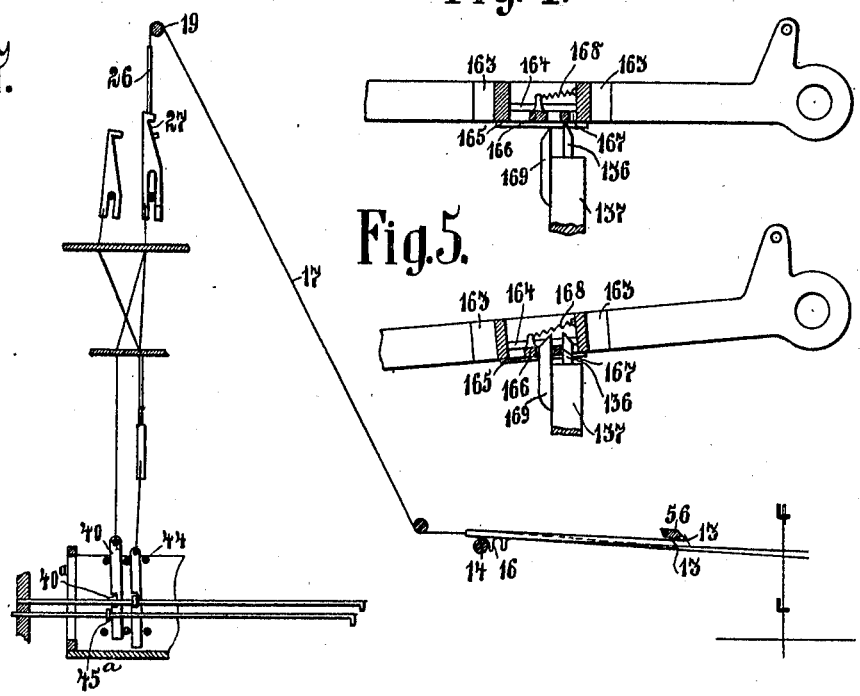

W. GREEVEN.
CARD CUTTING MACHINE.
APPLICATION FILED NOV. 10, 1909.
957,052.
Patented May 3, 1910.
9 SHEETS—SHEET 6.
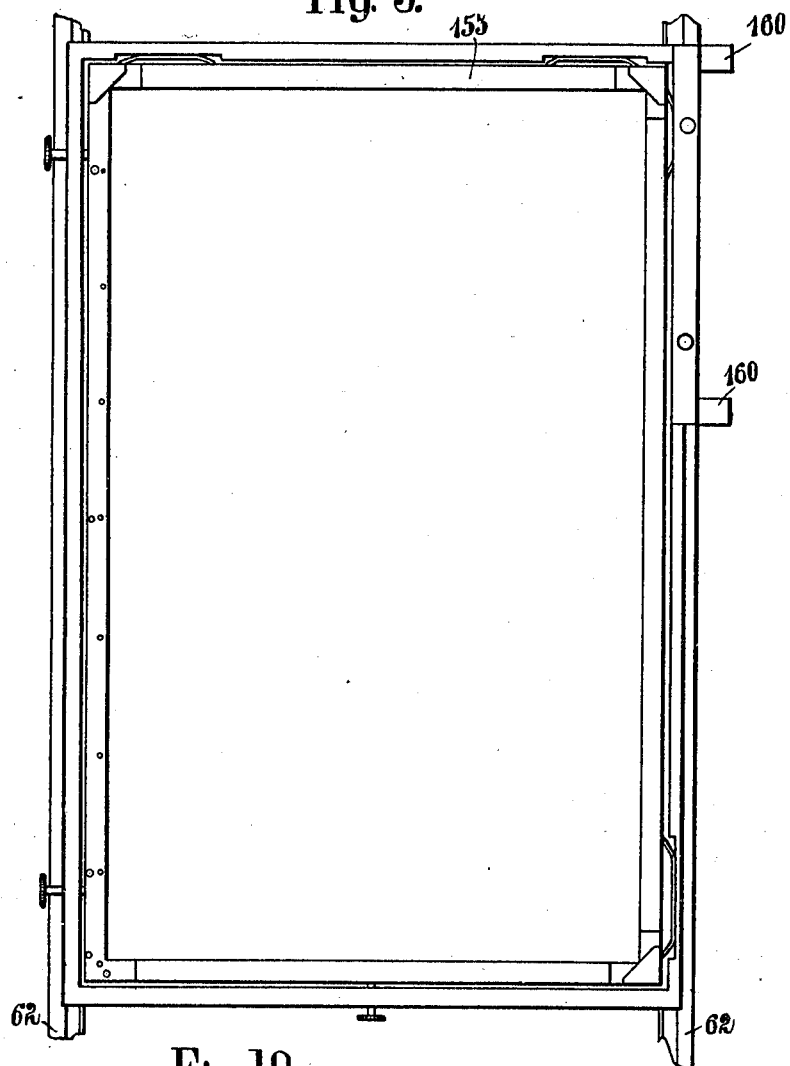

W. GREEVEN.
CARD CUTTING MACHINE.
APPLICATION FILED NOV. 10, 1909.

957,052.

Patented May 3, 1910.
9 SHEETS—SHEET 7.

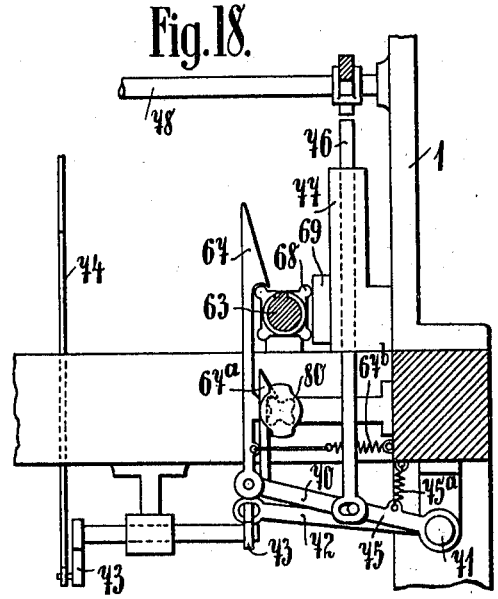
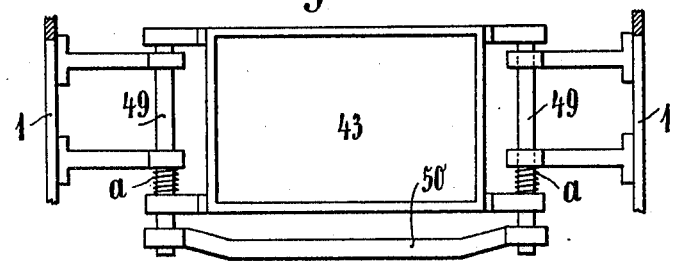
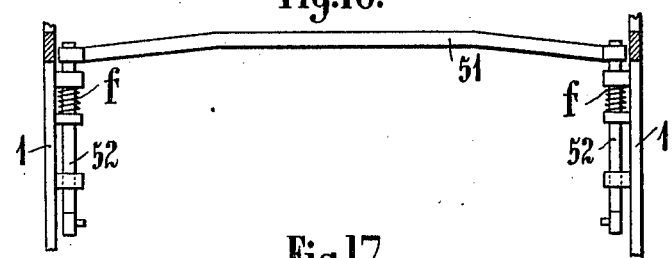
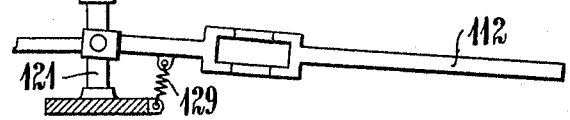

W. GREEVEN.
CARD CUTTING MACHINE.
APPLICATION FILED NOV. 10, 1909.

957,052.

Patented May 3, 1910.
9 SHEETS—SHEET 9.

UNITED STATES PATENT OFFICE.

WALTHER GREEVEN, OF CREFELD, GERMANY.

CARD-CUTTING MACHINE.

957,052.	Specification of Letters Patent.	Patented May 3, 1910.

Application filed November 10, 1909. Serial No. 527,138.

*To all whom it may concern:*

Be it known that I, WALTHER GREEVEN, a subject of the King of Prussia, residing at 13 Hohenzollernstrasse, Crefeld, Germany, have invented certain new and useful Improvements in Card-Cutting Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to card-cutting machines for Jacquard and similar looms, and a primary object is to provide a card-cutting machine in which the punches are read-in directly and automatically from the pattern by means of needles which correspond in number to the number of warp threads and perforate the pattern at the parts thereof free from the design, whereas they are held back by the parts of the design covered with paint, so that in the former case the hooks of an auxiliary jacquard device which are connected with the reading-in needles and control the locking bars of the punching device are actuated.

The separate parts of the machine, such as the lifting-blade operating the hooks of the auxiliary jacquard device, the punch box, and the perforated plate, are driven mechanically, whereas the upward and downward motion of the needles, the feed of the table carrying the pattern and the feed of the pattern cards are brought about manually by depressing a lever and thereby first lowering all those needles through the pattern which meet with no resistance owing to the paint on the pattern, whereas the needles striking the painted parts of the pattern are prevented from moving down farther. During the farther downward movement of the hand lever the device driving the lifting-blade, punch box and perforated plate is thrown into gear and automatically disconnected after one play, the needles being prevented during this time from rising prematurely in consequence of the hand lever being raised. When the lever is being raised the needles are first removed from the pattern and then the pattern table and pattern cards are fed, whereupon the machine is ready for a new play.

Figure 14:
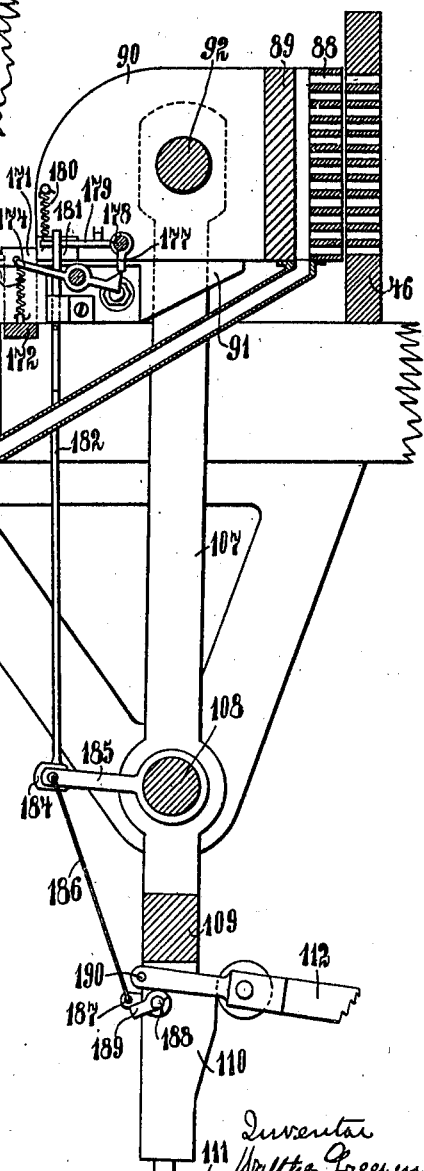
Figure 19:
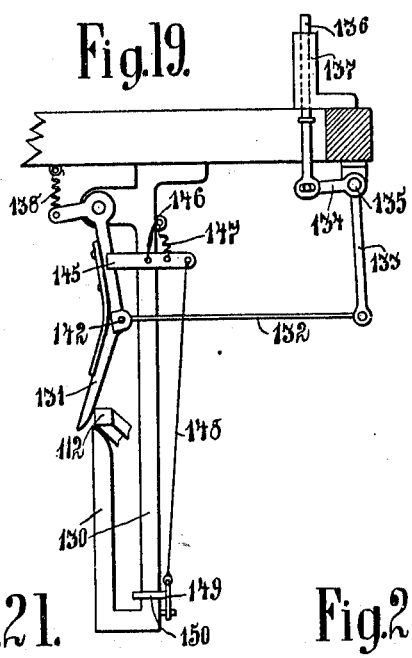
Figure 20:
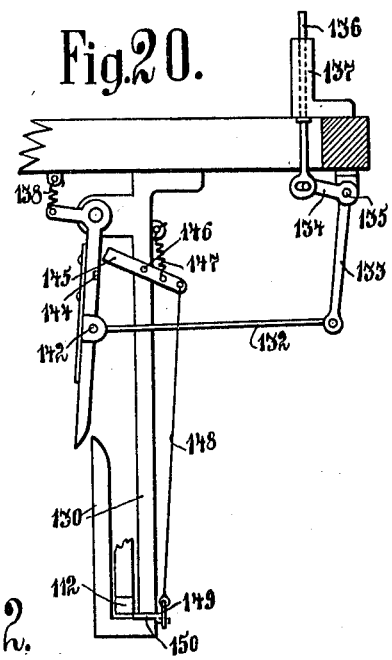
Figure 21:
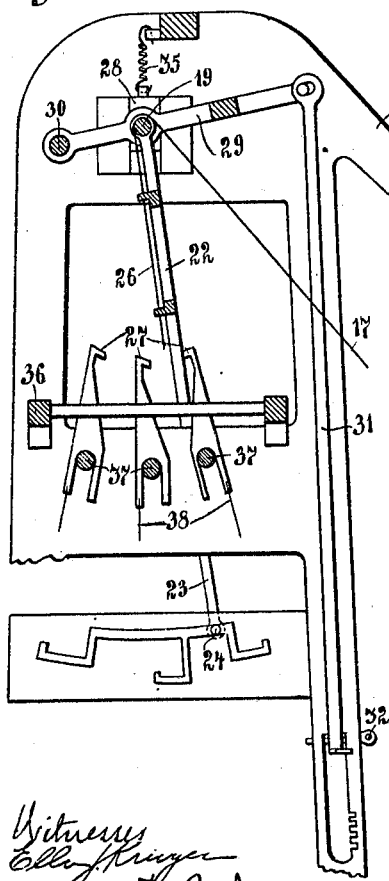
Figure 22:
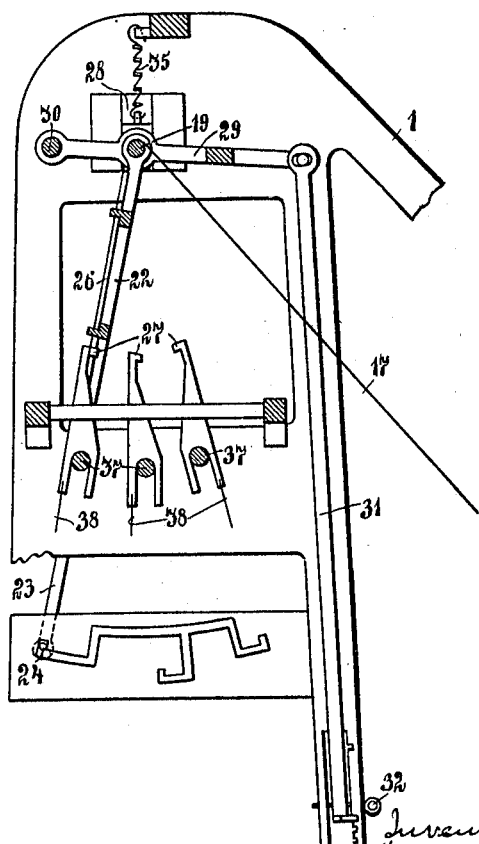

One constructional form of my card-cutting machine is represented by way of example in the accompanying drawings wherein:

Figures 1$^a$ and 1$^b$ show the machine in side elevation, partly in section, Fig. 2 in front elevation, and Fig. 3 in rear elevation; Fig. 4 is an elevation showing the device for connecting and disconnecting the mechanical driving gear of the machine at the moment of connection, and Fig. 5 is a like view after connection; Figs. 6 and 7 respectively show diagrammatically the connection of the needles with the bars operating the punches before and after the displacement of the lifting-blade pulling the cords; Figs. 8 and 9 are cross-section and top plan view, respectively, showing the pattern-frame; Fig. 10 shows one individual feeler needle; Fig. 11 shows needles before, and Fig. 12 after puncturing the pattern paper, and Figs. 13 and 14 show the device for fixing the perforated plate, when not fixed and fixed, respectively; Figs. 15 to 17 show details; Fig. 18 is a sectional elevation showing the means for feeding the pattern-frame and the cards, Figs. 19 and 20 are like views showing the device for throwing the main lever into gear, in various positions, and Figs. 21 and 22 show the reversing device for the punches in different positions.

As it was impossible, owing to the small size of the drawings, to represent all the needles, only some of them are shown.

Referring to the drawings, at the front of the machine are the pointed steel feeler-needles 3 (Figs. 1$^a$, 1$^b$ and 2) for receiving the pattern and made strong in the center. At their upper ends they have an oval eye 4 (Figs. 1$^a$ and 2) and terminate in a hook 5 by means of which they are arranged beside one another in front of a plate 6. The needles pass below through corresponding fine holes of a molding 8 attached to plate 6. This plate arranged movable between the guide rods 9 (Fig. 2) can be lowered by means of a hand lever 10 and is held in its highest position by springs 11 (Fig. 2) coiled around said rods. The extensions of the hooks 13 (Fig. 1$^b$) enter from the rear through a slot 12 in plate 6 and pass through the eyes 4 of the needles. These hooks are shaped in the manner of jacquard wire hooks, rest on the cross-bar 14 and are held sloping by the grating 15 (Figs. 1$^b$ to 3) comprising flat bars. The projections 16 (Fig. 1$^b$) prevent the hooks sliding back out of their normal position. To said hooks 13 are attached cords 17 passing over a roller 19 mounted above in the frame 1 in upwardly and downwardly movable slides 28 and connected with long steel wire loops 26. These loops hang in a frame 22 (Figs. 1ª, 2 and 3) revoluble around shaft or roller 19 and formed as a reversing device for cutting cards for patterns of various closeness of thread. To this end, I arrange on roller 19 a reversing lever 23 (Figs. 2, 3, 21 and 22) which can be held in any optional position by means of the pin 24 and gives the frame its necessary deflection. The raising and lowering of frame 22 required in addition for reversing is brought about by the upward and downward movement of the slides 28 in which roller 19 is journaled. The projecting ends of this roller or shaft pass through the ends of a second horizontal frame 29 revoluble around an axle 30, to which frame is imparted a deflection by a connecting-rod 31 so that shaft 19 and with it frame 22 and the loops 26 can be raised or lowered. Said connecting-rod is preferably firmly connected in its different positions with the side 1 of the frame by a pin 32 (Fig. 1ª). For balancing the weight of the reversing device coil springs 35 (Figs. 1ª to 3) are provided on the slides 28.

At a little distance below the steel wire loops 26 are located the rows of hooks 27 so arranged between the bars of a grate 36 (Figs. 1ª and 3) that when the loops 26 are in a suitable position the hooks 27 of every row hook into the corresponding loops. In their normal position hooks 27 rest on crossbars 37 (Figs 1ª and 3.) From these hooks cords 38 lead through corresponding harness-boards 39ª, 39ᵇ, 39ᶜ and 41 and connecting-boxes 42 downward to the locking bars 40 of the punching device. These locking bars are guided between bars 44 in a movable box-like frame 43 (Fig. 1ª). The horizontal punches 45 terminate in front in holes in plate 46. Bosses 45ª (Fig. 7) arranged in rows on the punches and corresponding notches 40ª in the locking bars serve for suitably actuating the punches. The fixed plate 48 (Fig. 1ª) prevents the punches sliding out backward. The punch box 43 is arranged movable in bearings, preferably arranged on the outside frame 1, by means of the guide rods 49 at both sides. By means of suitable springs $a$ (Fig. 15) arranged on the guide rods the box is held in its normal position to the rear. The rear guide rods projecting beyond the punch box are connected by a strong yoke 50 on which the driving mechanism acts. This entire device is represented diagrammatically in Fig. 15. Above this yoke 50 is arranged a second yoke 51 (Figs. 1ª and 3) firmly connected with the guide rods 52 mounted movable on frame 1. This arrangement is likewise held in its normal position by suitable springs $f$. This second yoke transmits the power of the driving mechanism to the lifting-blade by means of the connecting-rods 53 arranged at both sides and the lever 55 revoluble around axle 54.

Below the needles are the rails 62 (Figs. 1ᵇ and 2) serving for guiding a frame holding the pattern (Figs. 8 and 9). This frame can be moved forward by means of a screw shaft 63 (Figs. 1ᵇ and 2) revoluble in nuts 160 on the frame and in bearings 64 and 65. Said endless screw is driven by the turning-hook 67 (Figs. 1ª, 2 and 18) which coacts with a roller-head 68 having an elastic brake block 69. Said turning-hook is held in its position against the roller-head 68 by a spring 67ᵇ attached to the frame of the machine and is moved by an arm 70 fixed on an axle 71. On the latter is also an arm 72 which acts on a suitably arranged angle lever 73 and by means of this angle lever actuates the turning-hook 74 attached to the latter and serving for feeding the cards 101 which are to be punched (Figs. 1, 3 and 18). Axle 71 is rotated by an arm 75 on which acts a vertical connecting-rod 76 guided in a bushing 77. This device is held in its normal position by a spring 75ª on lever arm 75 and attached to the frame of the machine. The pressure required for moving the connecting-rod is exercised by the hand lever 10 with the intermediary of a lever arm 79 attached to the axle 78 (Fig. 1ᵇ).

On shaft 71 is, in addition, a small turning hook 67ª (Figs. 1ª and 18) which rotates an exchangeable cam 80 serving for temporarily disconnecting the turning-hook 67 of the screw shaft 63 in case of polychrome patterns. This cam 80 has on its periphery the number of projections corresponding to the colors to be punched, which projections move hook 67 out of engagement with head 68 of screw shaft 63. If shaft 71 is now rotated, turning-hook 74 will move the cards onward, but the pattern will remain stationary.

As support for the pattern when the needles enter it there serves a hollow crosspiece 81 provided with fine holes corresponding to the number of needles and filled with a fibrous material saturated with oil for the purpose of lubricating the needles. In order that the needles which have entered into the pattern paper may not raise it up I arrange behind the needles a molding or fillet 86 (Figs. 1ᵇ and 2) attached by means of suitable guide rods 87 to the needle plate 6. Owing to springs suitably arranged on these guide rods fillet 86 yields elastically upward when descending and when rising only leaves the paper when the needles are withdrawn therefrom.

The perforated plate 88 (Fig. 1ª) is arranged movable on a slide opposite the punch-plate 46. It is strengthened by a rear second plate 89 having projections 90 (Figs. 1a and 3) sliding on rails 91. In Fig. 3 the cross-piece connecting the rails has been omitted in order to allow these to be shown more clearly. Through the projections 90 there passes a powerful axle 92 carrying the cylinder comprising two disks 93. The cards are held on this cylinder in known manner by means of knobs or buttons which can enter into corresponding cavities in the punch-plate when the card aproaches the punch. In order to be able to punch cards of various lengths, however, I arrange the knobs sinkable, so that they retreat when the perforated plate approaches the punch-plate.

In order that the intermediate card held by the knobs may not lose its hold, at those places where the two holes in the punch-plate 46 must be located I attach to this plate two fixed knobs 95 (Fig. 1a); these are on thin steel bands which are placed correspondingly in front of the punches which are not used and screwed to the punch-plate below and above the rows of punches. Consequently the card between the plates is now released by the sinkable knobs and pushed onto the fixed knobs, whereby its position is secured. The yoke 98 gives the entire device the necessary support and carries the bearings 99 through which pass the guide rods 100 between which the whole moves.

The reciprocation of the perforated plate 88 is for allowing the cards the play necessary for their movement. They are moved by two arms 107 (Figs. 1a and 3) engaging the two ends for axle 92 and revoluble around the common axle 108. The entire device is held in its normal position by a spring 111 on arm 110. For fixing the sliding carriage 90 in its operative position I provide a locking device represented in Figs. 13 and 14 in its normal and operative positions, respectively.

In bearings 170 inside the rails 91 slide two bolts 171 connected by a cross-piece 172; when a two-armed lever 174 connected by means of spring 175 with cross-piece 172 is rocked said bolts pass behind projections 181 of the sliding carriage 90 and can bolt this in its end position. Lever 174 is rocked as follows: when carriage 90 moves forward, an elastically yielding tappet 177 on shaft 178 in the carriage slides along the free end of the slanting lever 174 and depresses the same. On shaft 178 is fixed, in addition, a lever arm 179 which is held horizontally against a shoulder of the carriage by a spring 180 and the draw-rod 182 rests on said arm. With the bottom end of said draw-rod engages an arm 184 connected with a second arm 185. These two arms are attached on axle 108 in such manner that they can move independently of the direction of rotation of the axle. To arm 185 is attached the pull wire 186 on which the short arm 187 acts. This arm is on one side of arm 110 and revoluble around axle 188. On the other side of arm 110 a tappet or wiper 189 is fixed in such manner on axle 188 that it yields elastically upwardly, whereas when pressed from above downwardly it abuts against a shoulder of axle 188 and rotates the same. On this tappet there acts at a suitable movement a projection 190, which is on the main lever 112 imparting the driving motion to the carriage. The carriage is unbolted by projection 190 coacting with tappet 189 and rotating the same, when arm 112 descends. This rotation is imparted by the above described lever transmission to shaft 178 whereby tappet 177 is deflected so that lever 174 can return into its horizontal position (Fig. 13) and the bolts descend.

The driving device consists principally of a main lever 112 (Figs. 1a and 2) which is depressed by an eccentric 113. On the main lever is arranged a draw-rod 114 which drives a slide 115 guided in a vertical groove 116. This slide has two sloping faces 117 on which two rollers 120 carried on short arms 118 (Fig. 1a) can run. These arms rock around bolts 119 and are pressed by the slide against the yokes 50 and 51, so that the lifting-blade 56 and the punching device are operated in the manner described above.

The lever arms 107 acting on the perforated plate are likewise moved by the extension of lever arm 112 beyond the pivot 121 (Figs. 1a and 2) a roller 122 on said extension sliding on a sloping face of arm 110 and thereby deflecting the same. The entire device is held in its normal position by the suitably arranged spring 123.

The eccentric 113 is driven from the main shaft 125 in suitable manner by toothed wheel gearing 125, 126.

Although the eccentric rotates uninterruptedly, it only coacts with lever 112 when this has been brought into its path. Generally said lever is pulled in its normal position by a spring 129 (Figs. 2 and 17) so far to the side that the eccentric does not contact it. Now if lever 112, which is revoluble laterally on its pivot owing to a suitable link, is placed at a suitable movement at right angles to its pivot 121, it is caught by the eccentric and pressed downward. The lateral pressure against this lever 112 necessary for throwing it into gear is produced by the hand lever 10 which operates an arm 131 acting suitably against lever 112. Arm 131 is mounted revolubly on the guiding device 130 in suitable manner above lever 112. With this arm engages a draw-rod 132 (Fig. 2) moved by a kind of angle lever whose arms 133 and 134 (Figs. 1a, 1b and 2) are attached to a shaft 135 serving as pivot. This angle lever is actuated, again, by the connecting-rod 136 guided in bushing 137. A spring 138 acting suitably on arm 131 holds this entire device in its normal position. In order that hand lever 10 shall not act on connecting-rod 136 before the needles and the entire device have arrived at their lowest position, the hand lever is provided with a hinge 139 (Fig. 1ᵇ). When the hand lever is being depressed spring 140 holds this joint stiff, and at the lowest position of the needles, the hand lever rests on a fixed projection 141 of the frame 1. The joint 139 now serves as fulcrum and when moved farther the hand lever moves the connecting-rod 136. The action of the hand lever on the connecting-rod, however, gives, as it were only the impetus for the motion for connecting the parts. As these operations have to follow in as rapid succession as possible, and as free as possible from all accidental occurrences, the connection and disconnection is brought about automatically. To this end, arm 131 is provided with a joint 142 (Figs. 2, 19 and 20) where the draw-rod 132 engages. The movable end of the arm is kept extended by a suitably arranged flat spring 143 (Fig. 1ᵃ). On this arm is in addition, a small shoulder 144 (Figs. 2 and 20) serving as abutment for a catch 145. This catch (Figs. 1ᵃ and 2) is preferably arranged elastic at one end in such manner that when the arm approaches the catch the latter moves over its shoulder and prevents it returning. In addition, the catch is revoluble at right angles to the motion of the elastic end around the fixed pivot 146 and is held in its normal position by a spring 147.

Attached to the fixed end of the catch projecting beyond the pivot is a powerful draw-wire 148 connecting the catch with lever 149 which serves as disconnector. This lever is preferably attached to the bottom end of the guide 130 and has a lateral projection 150 located in the direction of motion of lever 112. Now when this switching device is operated, namely draw-rod 132 pulled, arm 131 will bend at its joint 142. The top end is held by catch 145 and the bottom end is moved against the main lever 112 by the pressure produced by spring 143 which is now bent. Since spring 143 is rather stronger than spring 129 holding the main lever in its normal position, this lever is pressed lightly against eccentric 113. Now when the eccentric arrives into the position shown in Fig. 1ᵃ, the main lever slides under it and the operations begin. Toward the end of its downward motion lever 112 meets the projecting end 150 of the disconnecting lever 149, depresses this and raises catch 145 by rotating it around pivot 146, laterally away from the shoulder 144 on arm 131. The liberated arm 131 is now at once drawn back by spring 138 into its normal position. The main lever now rises again and is acted upon by spring 129 which pulls it laterally, after it has passed out of its guides, out of reach of the eccentric, whereby the machine is again thrown out of gear. A shoulder 151 (Fig. 1ᵃ) suitably arranged on the periphery of the eccentric aids in addition, the sliding away after each operation, in the event of friction between the main lever and eccentric not being able to be overcome for any reason by spring 129, said shoulder pushing the lever off each time. But in order that the pressure of hand lever 10 on the connecting-rod starting these entire preliminary operations may cease opportunely, I arrange on the hand lever a special switching device 162 (Figs. 1ᵇ and 2) specially represented in Figs. 4 and 5. Referring to these figures, in a box 163 arranged laterally on the manual lever are arranged movable between suitable slide rails 164 and 165 two connected cross-pieces 166 and 167. These cross-pieces are held in their normal position shown in Fig. 4 by springs 168 arranged at both sides of the lever. Below this device is the connecting-rod 136. On the bushing guiding the connecting-rod is arranged a lug 169 having a slanting face which terminates somewhat lower than the connecting-rod. Now when the lever is lowered at first cross-piece 167 presses on the connecting-rod 136. Shortly afterward, however, cross-piece 166 arrives on the slanting face of the lug. In this manner the two cross-pieces are pushed forward so that cross-piece 167 releases the connecting-rod. The action on the connecting-rod consequently ceases each time when the hand lever is in its lowest position, shown in Fig. 5 and all the previously described operations take place without the disturbing influence of the attendant of the machine.

In order to enable the operative feeler-needles 3 to be readily recognized, these are painted red and white at the same height (Fig. 10) and in front of the needles is arranged on plate 6 a plate 6ᵃ painted white having in its center a slot through which normally only the white portions of the needles are seen, whereas the red remain hidden. (Fig. 11.) Since the operative needles move upward relatively to plate 6ᵃ at the places in question red compartments appear on a white ground and the appearance of the slot during that operation is exactly like the view of the corresponding weft row on the pattern (Fig. 12) whereby errors are very readily recognizable.

The patterns are made precisely in the manner customary heretofore by means of the brush on suitable paper. This paper is preferably so strong that it is just punctured smoothly by the pointed feeler needles 3. Instead of the customary water-colors I use a suitable rapidly-hardening and highly-adhesive mass which must be such a thin liquid that it can be applied well with a brush. This mass is preferably colored during manufacture by admixing the desired colors.

My machine operates as follows: After stretching the pattern on the inner frame 153 (Fig. 9) so that its central axis coincides exactly with the center of the frame, the driving force is switched on. The hand lever 10 is now lowered, whereby needle plate 6 is also lowered. The needles 3 contact the pattern almost at the very commencement of this motion, as they are located quite close over it (Fig. 11). As the downward motion continues needles penetrate in virtue of their weight through the paper at the places not covered by paint but do not change their position relatively to plate 6. The needles cannot penetrate the places covered with a hard film of the colored mass, however, and are consequently elevated at these places relatively to plate 6, so that the red places appear behind the white slot (Fig. 12). But the hooks 13 (Fig. 6) connected with the lowered needles also descend and pass out of reach of the blade 56 against which all the hooks rest in the normal position. The remaining hooks, on the contrary, remain in their position in front of the blade. When hand lever 10 has arrived at the fixed shoulder 141 the work of the needles is finished. The hand lever is depressed now a little more, so that it rotates at its joint 139 until it lies on bushing 137. Connecting-rod 136 is thereby temporarily actuated and disconnected at the end of its motion by the switching device 162. The connecting-rod transmits the pressure of the hand lever through the above described lever transmission to the main lever 112 which lies against eccentric 113 and passes under this at a suitable moment. This operation is illustrated in Figs. 19 and 20. Fig. 19 shows the position before the main lever 112 is moved into its operative position and Fig. 20 the position at the moment when lever 112 sets the connecting device out of action. Now during the following operation of lever 112 slide 115 (Fig. 1ᵃ) is moved downward by the draw-rod 114. The upper of the slanting faces 117 of the slide first hits against roller 120 of the upper arm 118 which moves laterally the yoke 51 and the blade 56 connected with the latter. Now when moving, this blade moves forward the hooks 13 still within its reach and lifts the locking bars 40 connected with them which lie with their edges behind the bosses 45ᵃ of the punches 45 to be actuated, whereby the punches in question are placed ready for punching. The highest point of the upper slanting face of the slide has now passed the upper roller 120 and as the face now contacting with the latter is parallel with the plane of the slide, all further movement of the yoke and with it of the blade ceases. The plate 6 which descended is prevented from rising inopportunely by the projections 60 on the guide rods of blade 56 which slide onto the lugs 61 on the plate. In the meantime, however, the perforated plate 88 with the card in front thereof is brought up to and held at the punch plate 46. At this moment the bottom slanting face of slider 115 acts on the roller 120 of the bottom arm 118. The yoke 50 and with it the punch box 43 attached to the guide rods 49 is pressed forward with the locking bars 40, and the switched-in punches 45 perforate the card between the punch plate and perforated plate. The punched-out parts of the cards fall through the passage 105 into box 106 which is emptied from time to time.

When the punching movement finishes the main lever 112 has arrived into its lowest position and by pressing on the shoulder on lever 149 throws arm 131 out of gear, catch 145 being released by the movement of lever 149. When the eccentric end of lever 112 now rises, owing to the pressure of the projection 190 on the tappet 189 (Fig. 14) the perforated plate is unlocked and all the parts are subsequently returned in succession into their normal positions by the springs connected with them. The needles are removed from the pattern which is only subsequently released from the spring-pressed bar 86 so that the pattern is not carried up by the friction of the inserted needles. The hand lever now almost in its highest position again is lifted a little higher which is possible owing to the play provided in the connection of the lever with the needle plate. The lever arm 79 on the pivot of the hand lever presses on the connecting-rod 76 whereby the pattern is fed and the cylinder rotated. The hand lever is now lowered again and the operations are repeated.

In the case of polychrome patterns all the cards may not, of course, be cut in succession with one color, but cards for the intermediate colors must be let out. Therefore, after each cycle of operations of the machine, the hand lever must be lifted as frequently as the number of additional colors which are on the transparent sheets and have to be cut in succession on the free cards. But in order that, in the case of colored patterns, the pattern is not moved each time when raising the hand lever, the above mentioned cam wheel 80 is inserted having a number of projections corresponding to the number of colors.

Now as the entire cycle of operations obviously occurs during one movement of the hand lever, up to 30 cards per minute can be cut with this machine. For this output the eccentric must of course run at about 50 revolutions per minute, since the hand lever is never operated quite regularly and connection is frequently delayed, so that one cycle of operations is not always brought about every revolution of the eccentric.

It will be found that the efficiency of the improved machine, as herein described, is greatly increased as compared with the ordinary machines used for the same purpose and that with its use an operator without special training can turn out a much greater number of cards in a given time than has heretofore been possible.

In the above description it has been supposed that the auxiliary jacquard device is used for perforating the jacquard cards, but it may just as well serve as jacquard for directly moving the warp threads.

I claim:—

1. In a card-cutting machine, the combination, with an auxiliary jacquard device comprising a blade and hooks (13) resting thereon, of a punching device controlled by the cords of said jacquard device, mechanism for operating said punching device, driving means for actuating said mechanism, switching means for causing said driving means to coact with said mechanism, reading-in means comprising a row of vertically-movable needles connected with said hooks, and a jointed lever for moving said needles and subsequently actuating said switching means.

2. In a card-cutting machine, the combination, with an auxiliary jacquard device comprising a blade and hooks (13) resting thereon, of a punching device controlled by the cords of said jacquard device, mechanism for operating said punching device, driving means for actuating said mechanism, switching means for causing said driving means to coact with said mechanism, reading-in means comprising a row of vertically-movable needles connected with said hooks, and a jointed lever for lowering said needle, said lever being provided with a switching device adapted to coact with, operate and be disconnected from said switching means after said needles have been lowered.

3. In a card-cutting machine, the combination, with an auxiliary jacquard device comprising a blade and hooks (13) resting thereon, of a punching device controlled by the cords of said jacquard device, a cylinder revoluble in front of said punching device, mechanism for operating said punching device, driving means for actuating said mechanism, switching means for causing said driving means to coact with said mechanism; reading-in means comprising a vertically-movable plate, a row of needles on the latter, and a jointed lever (10) movably connected with said plate for lowering the same and adapted to coact with said switching means, said needles being connected with said hooks; feeding means for feeding a pattern under said needles, and means adapted to be operated by said lever for rotating said cylinder and actuating said feeding means.

4. In a card-cutting machine, the combination, with an auxiliary jacquard device comprising a blade and hooks (13) resting thereon, of reading-in means comprising a row of vertically-movable needles connected with said hooks, a punching device controlled by the cords of said jacquard device, a perforated plate movable in front of said punching device, a lever adapted to oscillate said plate, a pivoted arm, means connecting said arm with said blade, a second pivoted arm adapted to actuate said punching device, a slide having two faces adapted to coact with and rock said arms in succession, a two-armed lever pivotally connected with said slide and coacting with and adapted to rock said former lever, a continuously rotating eccentric, and means for causing said eccentric intermittently to rock said two-armed lever.

5. In a card-cutting machine, the combination, with an auxiliary jacquard device comprising a blade and hooks (13) resting thereon, of reading-in means comprising a row of vertically-movable needles connected with said hooks, a punching device controlled by the cords of said jacquard device, a perforated plate movable in front of said punching device, a lever adapted to oscillate said plate, a pivoted arm adapted to actuate said punching device, a slide adapted to coact with and rock said arm, a two-armed lever pivotally connected with said slide and coacting with and adapted to rock said former lever, a continuously rotating eccentric, and means for causing said eccentric intermittently to rock said two-armed lever.

6. In a card-cutting machine, the combination, with an auxiliary jacquard device comprising a blade and hooks (13) resting thereon, of reading-in means comprising a row of vertically-movable needles connected with said hooks, a punching device controlled by the cords of said jacquard device, a pivoted arm, means connecting said arm with said blade, a slide adapted to coact with and rock said arm, a two-armed lever pivotally connected with said slide, a continuously rotating eccentric, and means for causing said eccentric intermittently to rock said two-armed lever.

7. In a card-cutting machine, the combination, with the main lever (112), of a guide (130) for the same, a spring-pulled, two-part, jointed arm (131) mounted on said guide, a spring (143) on one part of said arm tending to keep the other part in alinement therewith, a shoulder on said arm, a spring-pulled catch (145) pivoted on said guide and adapted to engage said shoulder with one end, a draw-wire (145) attached by one end to the other end of said catch, a lever (149) pivoted on said guide and attached to the other end of said draw-wire, the latter lever having a projection (150) extending into the end part of said guide, and a rod (132) attached to said arm, for the purpose specified.

8. In a card-cutting machine, the combination, with the frame, and a main lever mounted to rock thereon, of a carriage (90) slidable on said frame, a bolt (171) mounted in said frame and able to lock said carriage in its forward position, a lever (174) pivoted on said frame, a spring (175) tensioned between said bolt and one end of the latter lever, a shaft (178) in said carriage, a tappet (177) on said shaft and adapted to coact with the other end of the latter lever (174), a spring-pulled lever arm (179) on said shaft, a spring-pulled, two armed lever (110) pivoted on said frame, movably connected with said carriage and adapted to be driven by said main lever, said main lever having a projection, and means comprising a draw rod (182) resting on said lever arm adapted to be actuated by said projection during the downward movement of the same.

9. In a card-cutting machine, the combination, with a punching device having a plurality of locking bars (40), of a plurality of sets of cords connected at one end with the latter, a plurality of sets of hooks equal in number to the number of said sets of cords connected with the other ends of said cords, a rocking frame (22); a blade (56), hooks (13) resting on the latter, a row of reading-in needles connected with the latter hooks; cords (17) connected at one end with the latter hooks and passing over said frame, loops (26) in said frame and connected with the other ends of the latter cords, and means for moving said frame and bringing said loops into engagement with said former hooks.

10. In a card-cutting machine, a reading-in device comprising a vertically-movable plate (6), a row of needles suspended in front thereof, and a plate (6ª) having a slot fixed in front of said needles, each of said needles being provided with two rings of different color visible through said slot.

In testimony that I claim the foregoing as my invention, I have signed my name in presence of two subscribing witnesses.

WALTHER GREEVEN.

Witnesses:
 KARL RODE,
 JOSEPH FÜHREN.